S. BLOCKSOM.
ADJUSTABLE BORING HEAD.
APPLICATION FILED OCT. 7, 1912.
1,066,878.  Patented July 8, 1913.
Fig. 1.
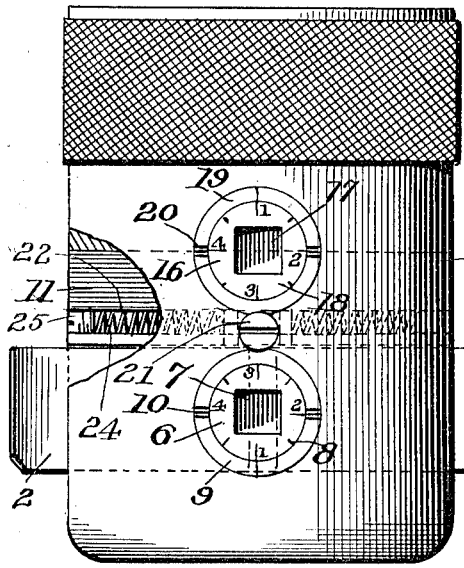
Fig. 2.
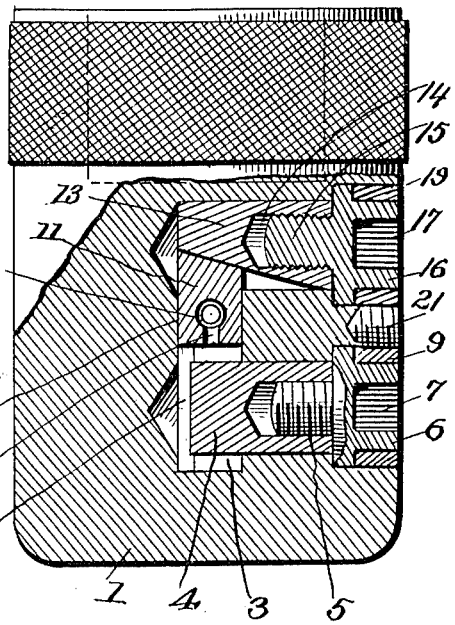
Fig. 3.
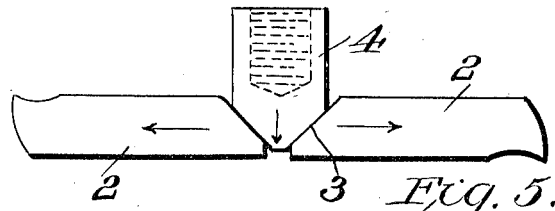
Fig. 4.
Fig. 5.
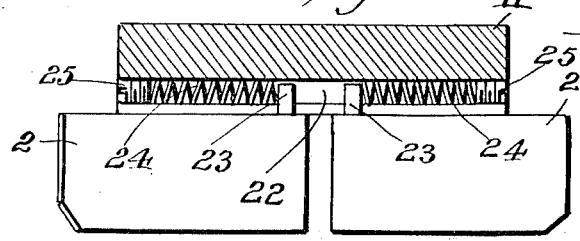
Inventor
S. Blocksom ered, the boring head is applied to a drill press or other suitable support whereby it may be rotated to cause the bits to cut the opening. If it be desired to change the position of the bits within the head, it may be readily effected by merely loosening the locking wedge and then turning the adjusting screw with a proper key or tool. The threaded engagement of the screw with the wedge or thimble will cause the adjustment of the bits to the desired extent and the locking wedge may then be forced down to cause the clamping bar to securely bind upon the bits and hold them in the adjusted position.

UNITED STATES PATENT OFFICE.

SAMUEL BLOCKSOM, OF MARION, OHIO.

ADJUSTABLE BORING-HEAD.

1,066,878.  Specification of Letters Patent.  Patented July 8, 1913.

Application filed October 7, 1912. Serial No. 724,453.

*To all whom it may concern:*

Be it known that I, SAMUEL BLOCKSOM, citizen of the United States, residing at Marion, in the county of Marion and State of Ohio, have invented certain new and useful Improvements in Adjustable Boring-Heads, of which the following is a specification.

The object of this invention is to provide simple and efficient means whereby bits may be adjusted and securely held in the adjusted position in order to form openings of various diameters.

A further object of the invention is to provide means whereby the bits may be accurately adjusted without being removed from the head and the adjusting mechanism securely locked in the desired position.

The invention is illustrated in the accompanying drawings and will be hereinafter first fully described and then particularly pointed out in the claims following the description.

In the drawings:—Figure 1 is an elevation, partly broken away, of a boring head embodying my invention; Fig. 2 is a vertical central section taken at right angles to Fig. 1; Fig. 3 is a detail view showing the manner in which the adjusting wedge engages the bits; Fig. 4 is a detail view of the means for clamping the bits in the boring head. Fig. 5 is a detail sectional elevation of a portion of the bit-securing mechanism.

The head, 1, is of any desired dimensions and is suitably shaped and finished to accommodate the bits and the parts co-acting therewith. The bits, 2, are fitted diametrically within the head and their inner ends are beveled, as indicated at 3, to be engaged by the inner tapered end of a wedge or adjusting thimble 4. The said tapered end of the adjusting wedge or thimble 4, as clearly shown in Fig. 3, will engage the opposed beveled faces of the bits, so that, as the wedge is driven farther into the boring head, the bits will be spread apart and projected to a greater degree beyond the circumference of the head. If the wedge be withdrawn, the bits may be pushed into the head so as to bear against the tapered end of the wedge and any desired adjustment of the bits may be thus readily effected. The outer end of the wedge or thimble is internally threaded to be engaged by the inner end of an adjusting screw 5 which has an enlarged head 6 formed with a socket 7 to receive a key or other tool whereby the screw may be turned and, by reason of its threaded engagement with the wedge or thimble, adjust the same radially of the head. The outer end of the head 6 is graduated, as indicated at 8, to constitute a dial, so that the adjustment of the screw may be accurately attained without requiring actual visual inspection of the screw or wedge.

Around the adjusting screw, within the head, is a collar or ring 9 which is constructed with notches 10 whereby it may be engaged by a wrench or other turning tool. The bits are fitted within a diametrical channel or chamber of the head, and within the said chamber or channel, above the bits and bearing directly upon the same, is a clamping bar 11. The upper edge of this clamping bar is inclined, as shown clearly in Figs. 2 and 4, and is engaged by the lower inclined surface 12 of a locking wedge 13 which is seated within an intersecting channel of the head and is provided at its outer end with an internally threaded socket 14 adapted to be engaged by an adjusting screw 15 which is similar to the adjusting screw 5, having an expanded head 16 formed with a socket 17. The head 16 is graduated, as shown at 18, and around the said head is a collar or ring 19 provided with notches 20 whereby it may be engaged by a suitable turning tool.

Between the collar or rings 9 and 19 is a set-screw 21 which is threaded into the body of the boring head and is adapted to engage the said rings or collars 9 and 19 which are formed with external longitudinal grooves to facilitate said engagement, as will be readily understood on reference to Fig. 1. The accidental removal of the said rings or collars will thus be prevented.

In the lower portion of the clamping bar 11 is a longitudinal slot or groove 22 opening through the bottom and ends of the bar, and pins or lugs 23 rise from the inner ends of the bits and play in said groove, as shown most clearly in Fig. 5. Springs 24 are fitted in the groove 22 with their inner ends bearing upon said pins 23 to hold the bits in engagement with the adjusting wedge 4, screw plugs 25 being secured in the ends of the groove to retain the springs therein as will be readily understood.

The operation of the device will be readily understood. The bits having been adjusted to cut an opening of the desired diameter, the locking wedge 13 is driven inwardly through the manipulation of the screw 15 and will thereby force the bar 11 down upon the bits so that they will be clamped firmly against the bottom of the channel or chamber in which they are seated. The set-screw 21 is then turned home within the body so that rotation of the collars 9 and 19 will be prevented and consequently the adjusting screws will be held in the positions in which they have been set.

The several parts of the mechanism are all housed within the boring head so that they operate without obstruction to its successful operation, and, as the several parts are simple in their construction, they are not apt to get out of order. Should excessive wear, through long continued use, prevent any part from performing its intended functions, it may be easily withdrawn and a new part supplied without necessitating the provision of an entire new boring head. When the adjusting screws have been turned home, the bits will be securely clamped within the boring head and cannot be accidentally dislodged or withdrawn.

My improvements may be applied to drill presses, boring machines or mills, engine lathes, turret lathes, or horizontal boring machines.

What I claim is:—

1. The combination of a boring head, a bit seated therein, a clamping bar mounted within the boring head and bearing upon the bit, an adjusting device mounted in the boring head and engaging the bit, an adjusting device mounted in the boring head and engaging said clamping bar, means for operating said adjusting devices, and a locking means common to both adjusting devices.

2. The combination of a boring head, bits fitted therein, a clamping bar within the boring head bearing upon the bits, adjusting devices mounted in the boring head and arranged to engage the bits and the clamping bar respectively, said adjusting devices having internally threaded outer ends, adjusting screws seated within the boring head and engaging said threaded outer ends of the adjusting devices, collars fitted around the heads of said adjusting screws, and a set-screw mounted in the head between said collars and engaging the same.

3. The combination with a head, of a bit seated radially therein, a clamping bar within the head bearing upon the bit, a spring carried by said bar and acting on the bit to hold the same normally retracted, means for projecting the bit in opposition to said spring, and means for locking said adjusting means.

4. The combination with a head, of a bit seated radially therein, a clamping bar within the head bearing upon the bit and having a groove in its under side, a pin rising from the bit and playing in said groove, a spring seated in said groove and bearing upon said pin to hold the bit normally retracted, means for projecting the bit in opposition to said spring, and means for locking said adjusting means.

In testimony whereof I affix my signature in presence of two witnesses.

SAMUEL BLOCKSOM. [L. S.]

Witnesses:
 WM. P. MOLONEY,
 G. E. MOUSER.

---

Copies of this patent may be obtained for five cents each, by addressing the "Commissioner of Patents, Washington, D. C."